Dec. 8, 1931. A. H. SCHAFFERT 1,835,243
SPACING MEANS FOR BOLT CONNECTED PLATES
Filed June 7, 1929
Fig.1.
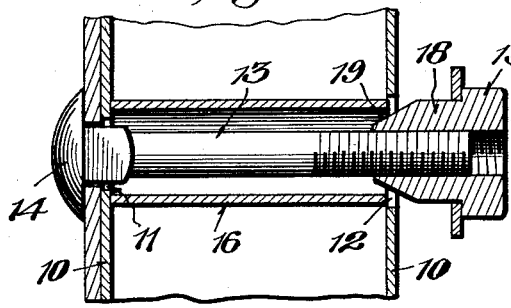
Fig.2.
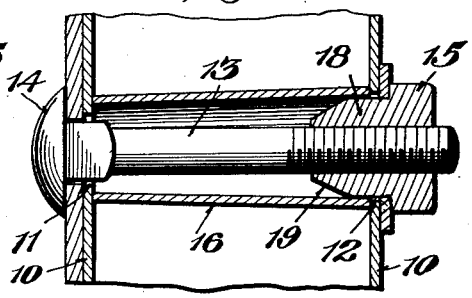
Fig.3.
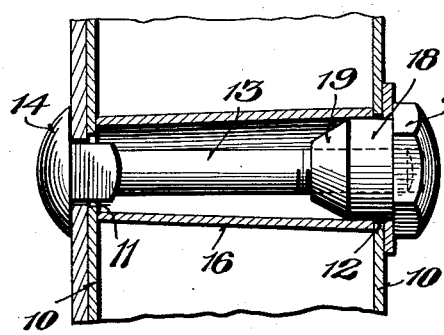
Fig.4.
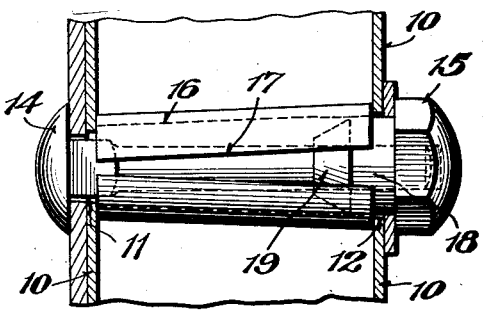
Fig.5.
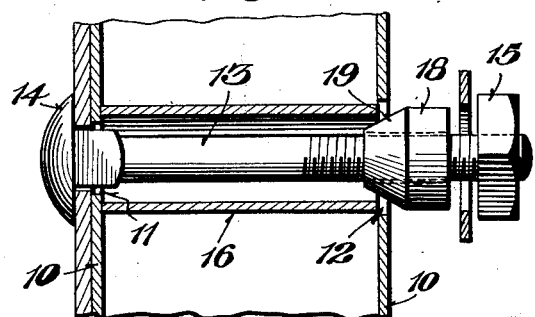
Fig.6.
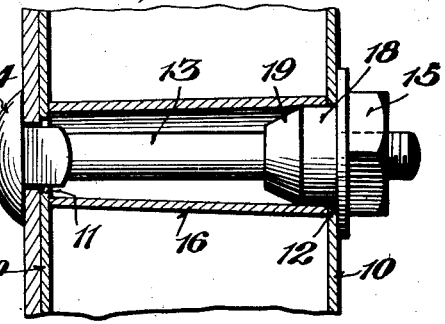
Fig.7.
WITNESSES:—
Inventor
Adolf H. Schaffert,
By
Attorney Patented Dec. 8, 1931

1,835,243

UNITED STATES PATENT OFFICE

ADOLF H. SCHAFFERT, OF YOUNGSTOWN, OHIO

SPACING MEANS FOR BOLT CONNECTED PLATES

Application filed June 7, 1929. Serial No. 369,160.

This invention relates to spacing means for a pair of plates having a bolt or bolts extending therethrough, whereby relative inward movement of the plates under the pressure developed by tightening of the bolt or bolts is prevented. The invention is capable of general application but is particularly designed for use in connection with hollow metal door stiles, rails and the like to prevent deformation of the stiles, rails, etc. by the bolts employed to secure hinges, latches, etc. thereto.

The general object of the invention is to provide a spacing means for bolt connected plates which is of simple, inexpensive construction and easy to position in operative relation between a pair of plates, and which is thoroughly reliable and efficient in use.

More particularly, it is an object of the invention to provide a spacing element which is insertable through the bolt hole in one of the plates, after the bolt has been engaged with the plates, whereby the bolt retains the element in a desired position between the plates, and which is expansible by tightening of a nut on the bolt whereby the plates are prevented from being deformed inwardly by tightening of the nut.

With the foregoing and other objects in view, the invention consists in the novel features of construction, combination and arrangement of parts as will be hereinafter more fully described, illustrated in the accompanying drawings and defined in the appended claim.

In the drawings, wherein like characters of reference denote corresponding parts in the different views:—

Fig. 1 is a sectional view illustrating the spacing member positioned between a pair of plates and before the same has been expanded.

Fig. 2 is a view similar to Fig. 1 illustrating the spacing member expanded.

Fig. 3 is a view similar to Fig. 1 illustrating a slightly alternative embodiment of the invention.

Fig. 4 is a view similar to Fig. 2 of the embodiment of the invention illustrated in Fig. 3.

Fig. 5 is a view similar to Figs. 1 and 3 illustrating another slightly alternative embodiment of the invention.

Fig. 6 is a view similar to Figs. 2 and 4 of the embodiment of the invention illustrated in Fig. 5; and Fig. 7 is a perspective view of the spacing member.

In each of Figures 1 to 6 of the drawings, 10, 10 designate a pair of spaced plates having alined holes 11 and 12 formed therein, respectively, through which extends a bolt 13. The head 14 of said bolt is disposed to the outside of one of the plates 10 and a nut 15 is adapted to be threaded on said bolt and disposed to the outside of the other plate 10. Thus, when the nut 15 is tightened there will be a tendency of the plates 10, 10 to collapse inwardly, as is manifest. To prevent this, a tube 16, split longitudinally as at 17, and of a length equaling the normal distance between the inner faces of the plates 10, is provided. The internal diameter of this tube is greater than the diameter of the bolt 13, over which it is adapted to be engaged, while the hole 12 is formed sufficiently large to enable said tube to be passed endwise therethrough. With the bolt 13 engaged through the plates 10 the tube 16 is engaged over the bolt and passed through the hole 12 to a position between the plates. A short cylindrical member 18 which may be formed either integrally with the nut 15 as shown in Figs. 1 to 4, or separate from said nut, as shown in Figs. 5 and 6, and which has a conical inner end 19, then is engaged with the bolt 13 and the nut tightened. The member 18 thus is forced inwardly on the bolt with the result that the conical end 19 of said member enters the adjacent end of the tube 16 and radially expands the latter. The diameter of the member 18 is such that said member snugly engages within the hole 12. Thus, when the tube 16, by continued inward movement of the member 18 is expanded so as to embrace the cylindrical portion of said member, the end of the tube will be of greater diameter than the hole 12 and will engage against the inner face of the plate surrounding said hole, thereby constituting a spacer between the plates 10, 10 resisting collapse of either plate due to the pressure set up by tightening of the nut 15. Moreover, due to the snug engagement of the member 18 within the hole 12, any lateral movement of the bolt relative to the plate provided with the large hole 12 is prevented.

In Figs. 1, 2, 5 and 6 of the drawings the nut 15 has its threaded bolt receiving opening extending entirely therethrough, while in Figs. 3 and 4 an acorn type of nut is illustrated. Also, as is obvious, the member 18 may be associated with the head 14 of the bolt instead of with the nut 15 as has been herein illustrated.

Any desired number of bolts may be employed for fastening any desired element or elements against either of the plates 10, 10, and all or only certain of said bolts may be provided with plate spacing means.

The invention, as aforesaid, is of particular advantage in connection with metal door frames and similar structures where the space between the plates 10, 10 is inaccessible, and where it is difficult to determine in advance where the bolts are to be located, which precludes the possibility of initially providing satisfactory spacing means of some other type between the plates.

Without further description it is thought that the features and advantages of the invention will be readily apparent to those skilled in the art, and it will of course be understood that changes in the form, proportion and minor details of construction may be resorted to, without departing from the spirit of the invention and scope of the appended claims.

I claim:

In combination with a pair of spaced plates, a bolt extending through holes in said plates, the hole in one of said plates being of materially larger diameter than said bolt, a split tube insertable through said larger hole and surrounding said bolt between said plates, and a nut threaded on said bolt, said nut having a cylindrical portion closely fitting said larger hole and having a conical inner end adapted to enter said tube to expand the latter, the cylindrical portion of said nut being of a length to extend entirely through the plate provided with the larger hole and to extend also into the sleeve, whereby the entire end surface of the sleeve is caused to lie entirely outside of the area of said larger hole when the cylindrical portion of the nut is disposed within the sleeve.

In testimony whereof I hereunto affix my signature.

ADOLF H. SCHAFFERT.